(12) United States Patent
Bhogavilli et al.

(10) Patent No.: US 7,599,286 B2
(45) Date of Patent: Oct. 6, 2009

(54) SYSTEM AND METHOD FOR ACHIEVING PATH SYMMETRY IN AN INTERNET PROTOCOL (IP) BASED NETWORK

(75) Inventors: Suresh Bhogavilli, Gaithersburg, MD (US); Samir Shah, Rockville, MD (US); Kaarthik Sivakumar, Santa Rosa, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 742 days.

(21) Appl. No.: 11/069,178

(22) Filed: Mar. 1, 2005

(65) Prior Publication Data

US 2006/0198298 A1    Sep. 7, 2006

(51) Int. Cl.
*H04L 12/28* (2006.01)
*H04L 12/66* (2006.01)
*G06F 15/16* (2006.01)

(52) U.S. Cl. .................. 370/217; 370/235; 370/401; 370/409; 709/230; 709/249

(58) Field of Classification Search ......... 370/216–240, 370/401, 402, 409; 709/230, 249
See application file for complete search history.

(56) References Cited

U.S. PATENT DOCUMENTS

| 6,501,760 | B1 * | 12/2002 | Ohba et al. ............. 370/395.42 |
| 6,778,498 | B2 * | 8/2004 | McDysan ................... 370/231 |
| 7,339,929 | B2 * | 3/2008 | Zelig et al. ................ 370/390 |
| 7,356,596 | B2 * | 4/2008 | Ramanujan et al. ......... 709/227 |
| 7,433,320 | B2 * | 10/2008 | Previdi et al. ............. 370/248 |
| 7,447,151 | B2 * | 11/2008 | McDysan ................... 370/231 |
| 2004/0025054 | A1 * | 2/2004 | Xue ......................... 713/201 |
| 2004/0174887 | A1 * | 9/2004 | Lee ........................ 370/395.53 |
| 2005/0114495 | A1 * | 5/2005 | Clemm et al. ............... 709/224 |
| 2006/0120288 | A1 * | 6/2006 | Vasseur et al. .............. 370/235 |
| 2006/0126502 | A1 * | 6/2006 | Vasseur et al. .............. 370/221 |
| 2006/0153067 | A1 * | 7/2006 | Vasseur et al. .............. 370/217 |
| 2006/0182035 | A1 * | 8/2006 | Vasseur ..................... 370/238 |
| 2006/0193247 | A1 * | 8/2006 | Naseh et al. ................ 370/216 |
| 2006/0193252 | A1 * | 8/2006 | Naseh et al. ................ 370/225 |
| 2008/0316914 | A1 * | 12/2008 | Vercellone et al. ......... 370/216 |

OTHER PUBLICATIONS

"Sample Configurations for Load Sharing with BGP in Single and Multihomed Environments", Cisco Internet Article, Jun. 20, 2003, p.1-18.
"How BGP Routers use the multi-exit discriminator for best path selection", Cisco Internet Article, Oct. 18, 2004, p.1-13.

* cited by examiner

*Primary Examiner*—Alpus H Hsu

(57) ABSTRACT

A system and method for improving network performance when communicating between a first site network and a second site network via an IP-based transport network. The site networks include a LAN, a plurality of host/media gateways (MGWs) connected to the LAN, and pairs of first and second Site Edge Routers (SERs) connected to the LAN for handling traffic from different host/MGWs. The SERs are configured as redundant backup pairs in which each SER in a given pair backs up the other SER in the pair. Each SER is connected to a different Provider Edge (PE) router in the transport network via a dedicated link that has sufficient spare capacity to carry traffic coming from both of the SERs in a given pair of SERs in case one of the SERs fails. The SERs provide preferred routing prefixes to the PE routers, thereby guaranteeing symmetric paths for bidirectional traffic.

23 Claims, 3 Drawing Sheets

SYSTEM AND METHOD FOR ACHIEVING PATH SYMMETRY IN AN INTERNET PROTOCOL (IP) BASED NETWORK

BACKGROUND

The present invention relates to communication systems. More particularly, and not by way of limitation, the present invention is directed to a system and method for improving network performance in an Internet Protocol (IP) based network by providing path symmetry, resilience, and scalability.

Telecommunication site operators are increasingly deploying packet-switched networks to carry voice traffic over IP instead of traditional circuit-switched networks. In this process, analog voice calls are digitized or otherwise transcoded using Media Gateways (MGWs) and encapsulated in IP packets. These IP packets are transported over a network consisting of the operator's own IP network (hereinafter called the "site network") and over its provider's networks to other MGWs before being delivered to the called party. The traffic handled by the MGWs can be voice traffic or other media. In the description herein, this type of traffic is referred to as Circuit Switched payload (CS Payload) traffic to identify the traffic handling requirements of such traffic.

An IP network managed by a single administrative domain is called an Autonomous System (AS). Connectivity between autonomous systems is provided by a routing protocol called Border Gateway Protocol (BGP), whereas connectivity within an autonomous system is managed by Interior Gateway Protocols (IGPs) such as Open Shortest Path First (OSPF) and Intermediate System to Intermediate System (IS-IS) routing protocols. BGP enables the exchange of routing information based on administrative policies. IGPs, on the other hand, compute the best paths internal to the autonomous system based primarily on a given metric. When more than one path exists to a given destination with the same cost, all of the paths can be used to forward traffic through the autonomous system. This is called Equal Cost Multi-Path (ECMP). ECMP can be used, for example, to provision multiple links between two routers to address bandwidth limitations of an existing link.

BGP can be deployed in two modes: External BGP (eBGP), which is used to interconnect two autonomous systems, and Internal BGP (iBGP), which is used between two border routers of the same autonomous system to exchange BGP information learned by eBGP-speaking routers. Additionally, to support large autonomous systems, an autonomous system can be divided into multiple internal autonomous systems, called Confederations (BGP_CFD), and eBGP can be used to exchange routing between confederations. This process is referred to as "eiBGP" herein.

FIG. 1 is a simplified block diagram of an existing network topology connecting an IP Site Network 11 operated by a telecommunication site operator to an IP transport network 12. The Site Network includes a Host/MGW 13, a LAN 14, and a Site Edge Router (SER) 15. The Site Network is connected to the transport network using two routers. The SER 15 is the router on the Site Network's border and belongs to the telecommunication site. A Provider Edge (PE) router 16 is on the edge of the transport network. Thus, the PE router connects to the Site Network via the SER.

Site Networks require the network nodes to be resilient and scalable. IP router resiliency is typically achieved using the Virtual Router Redundancy Protocol (VRRP). VRRP allows two IP routers to backup each other when connected over a Local Area Network (LAN). The hosts and MGWs of the site have a default route to the SER. The SER runs a routing protocol to the PE router. The SER also has a connected route for its network to the host. If there are application nodes internal to the site that also run routing protocols, the SER may run an IGP on the host LAN. In general, an SER can be connected to multiple host LANs, even though only one such LAN is shown in FIG. 1.

IP packets are transported in packet-switched networks primarily based on packet destination addresses. Packets exchanged between two media gateways, for example, are routed independently purely based on the destination media gateway address. As a result, there are no guarantees that all traffic belonging to a single voice call will take the same route in each direction. This asymmetric packet forwarding poses several problems in adapting IP networks to carry CS Payload traffic. First, the propagation delay is different in each direction. Hence the latency perceived by the two parties of a voice call is different, resulting in unsatisfactory conversational experience. Second, when a link or router fails, asymmetric routing affects double the number of voice calls compared to circuit-switched forwarding where paths can be set to be symmetric.

FIG. 2 is a simplified block diagram of an existing asymmetric network topology connecting an MGW 21 to a transport network 12 through routers on two LAN interfaces, LAN1 and LAN2. The routers include SER1 22 and PE1 23 on the LAN1 interface, and SER2 24 and PE2 25 on the LAN2 interface. In the illustrated example, the MGW is servicing ten (10) calls with asymmetric outbound and inbound paths as shown. If either of the two links fails, or if any of the routers fail, all of the calls are dropped. If the paths taken by the bidirectional calls are symmetric, only those calls using the failed link or router would be dropped, leaving the remaining calls unaffected.

The problem is exacerbated when ECMP is used to achieve scalability of bandwidth with multiple low bandwidth links and routers. With ECMP, packets belonging to the same call flow are forwarded to the same nexthop router, but there is again no guarantee that the outbound and inbound flow of a given call will follow the same path.

The only known solutions to achieve path symmetry is by building an IP network using link layer technologies that offer path symmetry, such as Asynchronous Transfer Mode (ATM), Frame Relay, or more recently Multi-Protocol Label Switching (MPLS). These solutions require that the entire network between MGWs be built using similar circuit-switched technology. Increases in traffic load are addressed by procuring high bandwidth links and more powerful routers and switches. This results in a disproportionate increase in capital expenditure costs for the site operator compared to increases in network capacity.

SUMMARY

The present invention is a system and method for improving network performance in an Internet Protocol (IP) based network by providing path symmetry, resilience, and scalability. The invention utilizes pure IP technologies without requiring circuit-switched link-layer technologies or MPLS.

Thus, in one aspect, the present invention is directed to a system for improving network performance when communicating between a first site network and a second site network via an Internet Protocol (IP) based transport network. The first and second site networks include a local area network (LAN) and a plurality of host/media gateways (MGWs) connected to the LAN. The system includes first and second Site Edge Routers (SERs) in each site network that handle traffic from different host/MGWs. The SERs are connected to the LAN as a redundant backup pair in which each SER in a pair backs up the other SER in the pair. The first and second SERs are connected to first and second Provider Edge (PE) routers in the transport network. The first SER connects to the first PE router via a first SER-PE link, and the second SER connects to the second PE router via a second SER-PE link. Each of the SER-PE links has enough spare capacity to carry traffic coming from both the first and second SERs in case the first or second SER fails. The system also includes means within the first and second SERs for providing preferred routing information to the first and second PE routers, thereby guaranteeing symmetric paths for bidirectional traffic.

In another aspect, the present invention is directed to a method of providing path symmetry, resilience, and scalability when communicating between a first site network and a second site network via an IP-based transport network, wherein the first and second site networks include a LAN and a plurality of host/MGWs connected to the LAN. The method includes connecting first and second SERs to the LAN as a redundant backup pair in which each SER in a pair backs up the other SER in the pair, and the SERs in each site network handle traffic from different host/MGWs. The method also includes connecting the first and second SERs to first and second PE routers in the transport network, wherein the first SER is connected to the first PE router via a first SER-PE link, and the second SER is connected to the second PE router via a second SER-PE link, and each of the SER-PE links has enough spare capacity to carry traffic coming from both the first and second SERs in case the first or second SER fails. The method also includes providing by the first and second SERs, preferred routing information to the first and second PE routers, thereby guaranteeing symmetric paths for bidirectional traffic.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

The present invention is a system and method for providing path symmetry, resilience, and scalability to an IP-based Site Network. The following building blocks are used in the present invention to provide these features:

Resilience: 1+1 redundancy is used. Each SER in the Site Network is backed up by another SER. There is always an even number of SERs in the Site Network. VRRP is used between each primary and backup SER pair. Both SERs actively forward traffic for different hosts/MGWs.

Link provisioning: Each SER is connected to one and only one PE router via a single link. Each SER in a primary and backup SER pair is connected to a different PE router for resilience against PE router failure. Additionally, each SER-PE link is sized to have enough spare capacity to carry the traffic coming from the SER it is backing up, in order to handle any SER, PE router, or SER-PE link failures.

Scalability: If scalability of link bandwidth is desired, then hosts or MGWs may be connected to the SERs over different LANs. If SER scalability is desired, then additional SER pairs are connected to the Host LAN.

Routing Protocols: The SERs may use eBGP to exchange routing information with the PE routers. The two SERs in a primary and backup SER pair run iBGP between them. Note that BGP, unlike IGPs, does not utilize a cost or metric for a route. Instead, eBGP utilizes the BGP Multi-Exit Discriminator (MED) to convey the route preference. The MED is translated into a "local preference" in iBGP when the routes are exchanged between the provider's edge routers within the provider's transport network. When the routes are redistributed in IGP, the IGP route metric is derived from the BGP MED value.

Route selection: A route learned via eBGP is preferred over an iBGP or an IGP route. When an SER learns the same route from three of its neighbors, first using eBGP, second using iBGP, and third using IGP, the SER always prefers the eBGP route to the other routes and forwards any traffic to the first neighbor.

Load distribution: The MGWs and hosts serviced by two SERs are divided into host groups in one of two ways. First, the same pair of SERs may service multiple LANs, and hosts on each of those LANs form a host group. Second, a pair of SERs may exclusively support one large LAN, and the IP subnet of that LAN may be divided into multiple host groups. All of the hosts within a host group are configured to use the same SER as a default router. This achieves outbound traffic load distribution. To achieve inbound load distribution, different SERs advertise the route prefix of different host groups with a high preference (low BGP MED). This guarantees symmetric paths for bidirectional traffic. Each SER also advertises the route prefix advertised by the other SER in its backup SER pair, but with a lower preference (higher BGP MED). In this way, if the primary SER fails, there is always a backup path known in the transport network via the backup SER.

Figure 1:
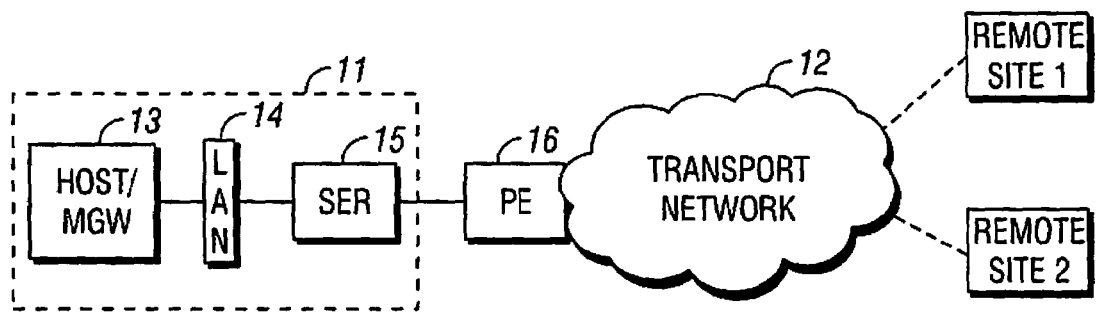
FIG. 1 is a simplified block diagram of an existing network topology connecting a Site Network to an IP transport network.
Figure 2:
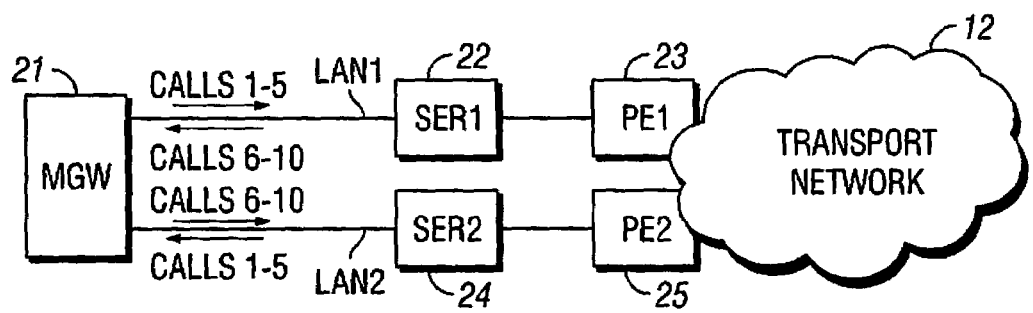
FIG. 2 is a simplified block diagram of an existing asymmetric network topology connecting an MGW 21 to a transport network 12 through routers on two LAN interfaces.
Figure 3:
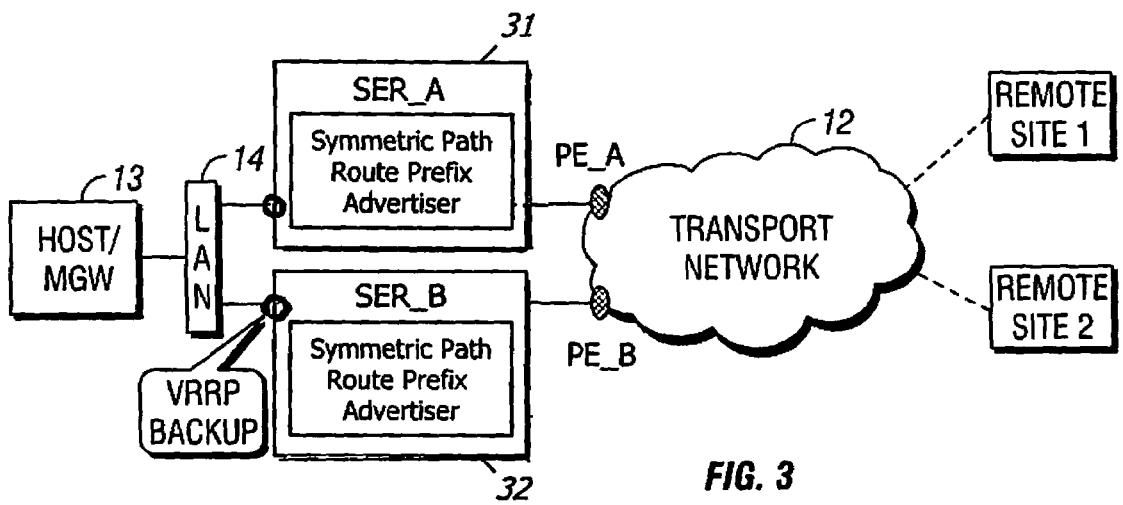
FIG. 3 is a simplified block diagram of a symmetric network topology connecting a Host/MGW 13 to an IP transport network 12, in accordance with the present invention.

FIG. 3 is a simplified block diagram of a symmetric network topology connecting a Host/MGW 13 to an IP transport network 12, in accordance with the present invention, and illustrating some of the features described above. For resilience, 1+1 redundancy is used. SER_A 31 and SER_B 32 form a primary and backup SER pair, and use VRRP between them. If SER scalability is desired, then additional SER pairs may be connected to the Host LAN 14. Each SER in the primary and backup SER pair is connected to a different PE router for resilience against PE router failure. Additionally, the link from SER_A to PE_A is sized to have enough spare capacity to carry the traffic coming from SER_B. Likewise, the link from SER_B to PE_B is sized to have enough spare capacity to carry the traffic coming from SER_A. In this way, the topology has the resilience to handle any SER, PE router, or SER-PE link failures.

Figure 4:
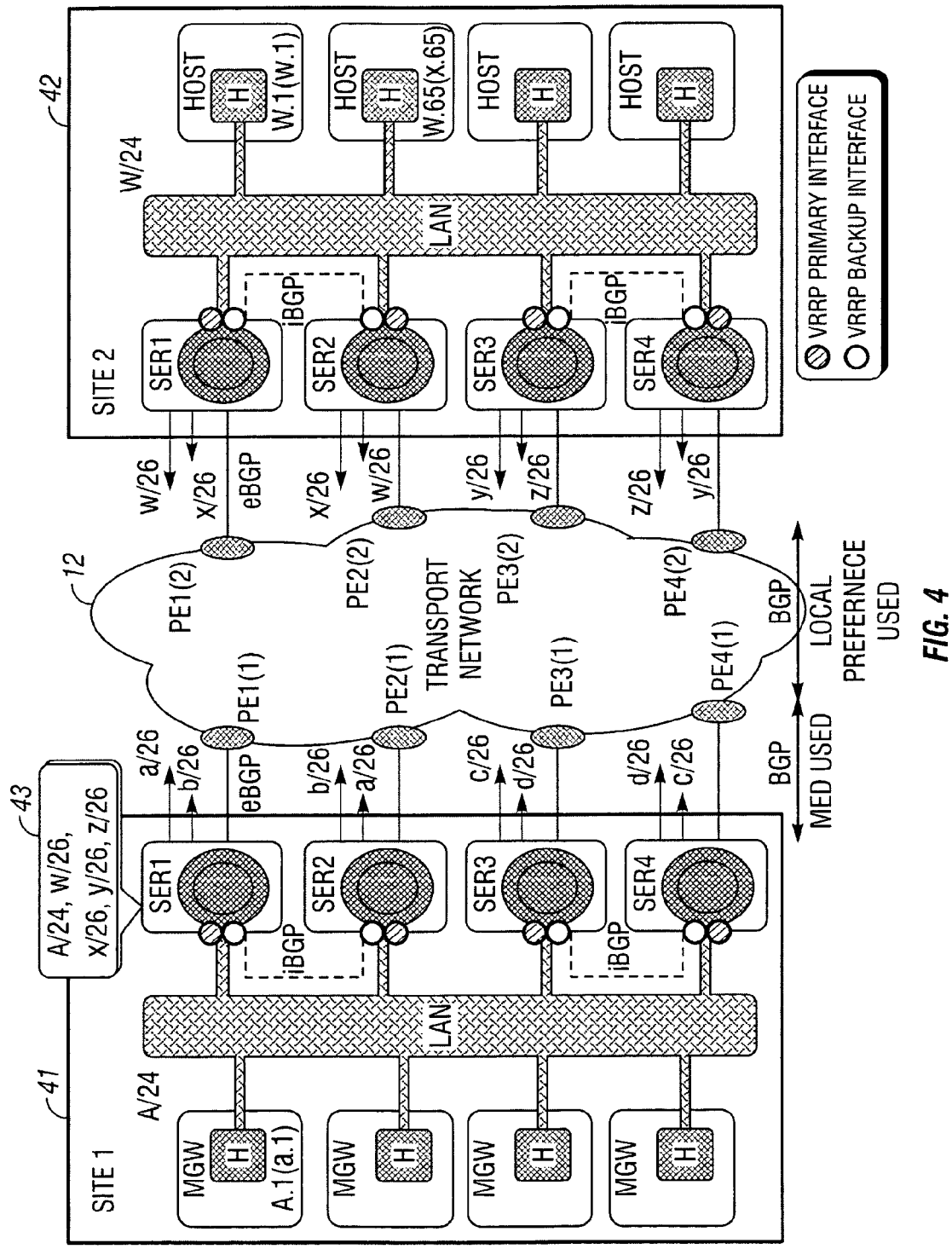
FIG. 4 is a simplified block diagram illustrating the interconnection of two sites via an IP transport network, in accordance with the present invention.

FIG. 4 is a simplified block diagram illustrating the interconnection of two sites 41 and 42 via an IP transport network 12, in accordance with the present invention. The building blocks discussed above are utilized to build two planes of connectivity between the two sites. The network thus built provides symmetric connectivity between any two MGWs. This is true even in the presence of any single failures in the network.

In this example, Site1 41 includes a LAN with route prefix, A/24. Site2 42 includes a LAN with route prefix, W/24. Four Host/MGWs are connected to the LANs at each site. Hosts within each site are only aware of these route prefixes in addition to a default route. There are four SERs at each site to handle the traffic load (providing scalability). All four SERs at each site are actively used to forward traffic, but each SER backs up another SER using VRRP to provide resiliency. SER1 and SER2 form a primary and backup SER pair, as do SER3 and SER4, at each site.

The Site1 address space, A/24, is divided into four host groups: a/26, b/26, c/26, and d/26. Similarly, the Site2 address space, W/24, is also divided into four host groups: w/26, x/26, y/26, and z/26. SER1(Site1) is configured to advertise a route, a/26, to its PE router, PE1(Site1), with a high preference via eBGP, and to advertise route b/26 for SER2(Site1) with a lower preference. It is important to note that the routes are present only in BGP's internal routing tables and not in the forwarding layer of SER1(Site1). These more specific host group route prefixes are not advertised to any other route within Site1. The preference is advertised as a MED, and the PE1(Site1) router translates this into the local preference value when re-advertising it to other PE routers. When all the SERs at both sites are configured similarly, all the PE routers within the transport network 12 are aware of the best egress PE router to use to reach any destination within the host groups.

The two SERs in each SER pair run iBGP between them. Thus, if the link between a first SER and its PE router fails, or if the PE router itself fails, the first SER uses its paired SER and the paired SER's PE router as an alternate path to forward traffic from the first SER's hosts to the final destination. The routes learned using iBGP are only used in case of the above failures. Note that the iBGP sessions are set up pair-wise and not in full-mesh between all the SERs of a site.

FIG. 4 also shows a routing table 43 resulting from this configuration at SER1(Site1). SER1(Site1) has a connected route A/24 because of its interface on the host LAN. It also learns of the routes w/26, x/26, y/26, and z/26 from the PE1(Site1) router. With this configuration, it can be shown that during normal operation and also in stable state after router failure, paths taken by traffic between any two hosts are symmetric. As an example, the paths between host A.1 (which is also a.1) and host W.1 (which is also w.1) are as follows:

A.1->SER1(Site1)->PE1(Site1)->PE1(Site2)->SER1(Site2)->w.1
W.1->SER1(Site2)->PE1(Site2)->PE1(Site1)->SER1(Site1)->A.1.

As another example, the paths between host A.1 (which is also a.1) and host W.65 (which is also x.65) is as follows:

A.1->SER1(Site1)->PE1(Site1)->PE2(Site2)->SER2(Site2)->W.65
W.65->SER2(Site2)->PE2(Site2)->PE1(Site1)->SER1(Site1)->A.1.

All these paths are symmetric. Also in case SER1(Site1) fails, VRRP moves the IP and MAC addresses of SER1(Site1) to SER2(Site1), transparently to the hosts in the group a/26. Communication between A.1 and W.1 takes the following paths after routing reconvergence in the provider's network:

A.1->SER2(Site1)->PE2(Site1)->PE1(Site2)->SER1(Site2)->W.1
W.1->SER1(Site2)->PE1(Site2)->PE2(Site1)->SER2(Site1)->A.1.

These paths are again symmetric. Return traffic from PE1(Site2) goes to PE2(Site1) instead of PE1(Site1) because when the SER1-PE1(Site1) link fails, PE1(Site1) no longer receives route advertisements from SER1(Site1) and withdraws the a/26 and b/26 routes it advertised earlier. This leaves the a/26 advertisement from PE2(Site1) to be preferable, and traffic is routed to PE2(Site1) as a result.

Also in case the failure of PE1 (Site1), the above traffic takes the following paths:
1. A.1->SER1(Site1)
2. SER1(Site1) sends ICMP redirect to A.1 to use SER2(Site1) (because that is from where SER1(Site1) learns route w/26 via iBGP)
3. A.1->SER2(Site1)->PE2(Site1)->PE1(Site2)->SER1(Site2)->W.1
4. W.1->SER1(Site2)->PE1(Site2)->PE2(Site1)->SER2(Site1)->A.1

Note that these paths are also symmetric.

Figure 5:
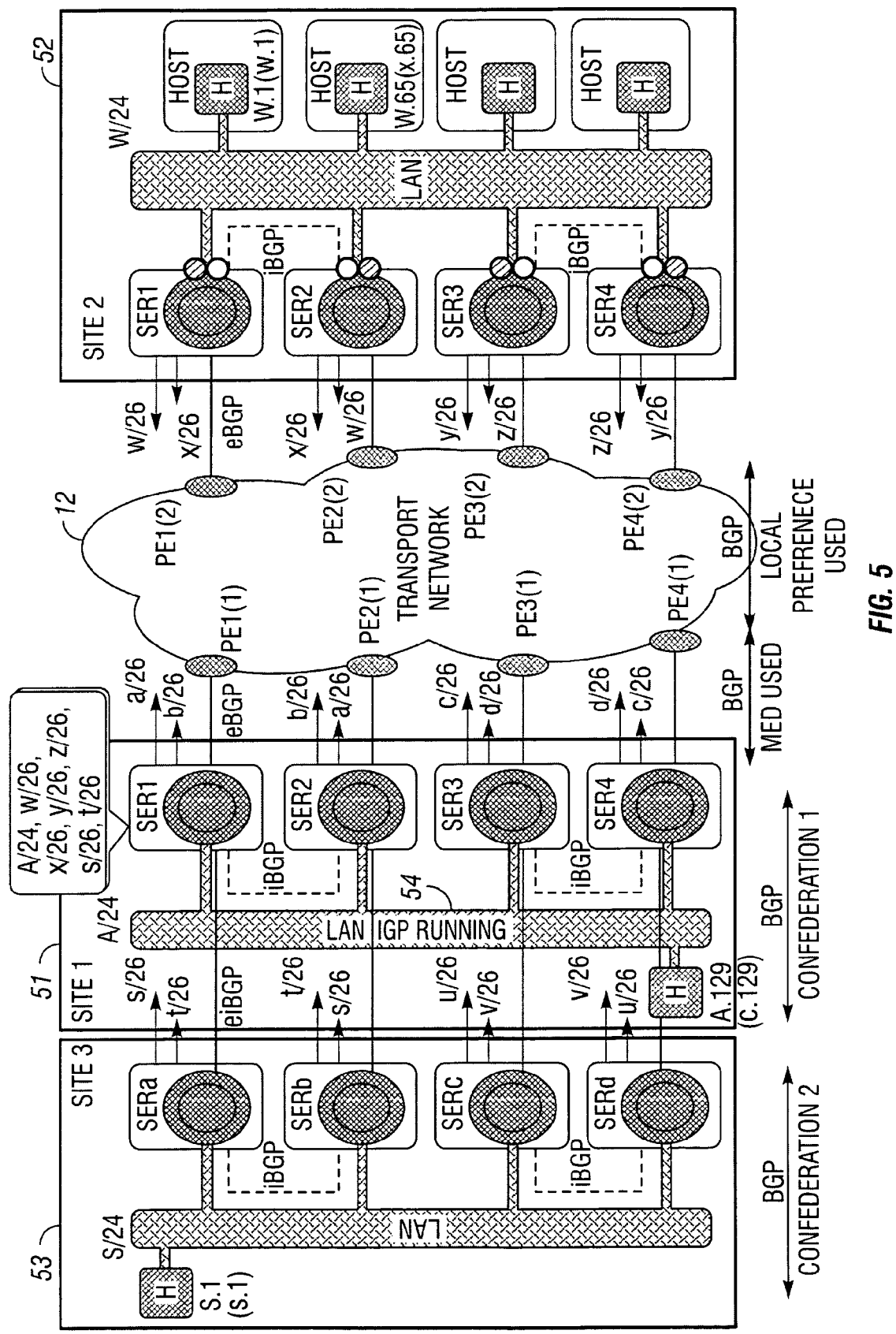
FIG. 5 is a simplified block diagram illustrating the interconnection of three sites via an IP transport network, in accordance with the present invention.

FIG. 5 is a simplified block diagram illustrating the interconnection of three sites 51-53 via an IP transport network 12, in accordance with the present invention. Site3 53 may be connected directly to Site1 51 without having to connect to the provider transport network directly. This topology provides Site3 with access to the transport network and other sites. As seen from the SERs of Site3, the topology extends the transport network to include Site1. Like Site1 and Site2, the SERs of Site3 are implemented in backup pairs utilizing iBGP between the SERs of each pair. The invention utilizes eBGP between the SERs of Site3 and the SERs of Site1. However, to run eBGP between routers, they need to be in different Autonomous Systems. To work around this limitation, each site is configured as a BGP confederation, running eiBGP between them.

Each SER of Site3 is connected to one and only one SER at Site1. If there are more SERs at site 3 than at Site1, then multiple Site3 SERs connect to the same "provider router" SER at Site1. If there are fewer SERs at Site3 than at Site1, then only a few routers at Site1 need to act as "provider routers".

For Site1 to act as part of the transport network for Site3, all of the SERs at Site1 need to exchange routing information between them to provide full connectivity for Site3. Therefore an Interior Gateway Protocol (IGP) such as OSPF or IS-IS routing protocol is configured between the Site1 SERs and run on the LAN 54. Only routes learned from eiBGP sessions are redistributed into this IGP. To not lose the preference of the routes after they are redistributed into the IGP, the route preferences may be used to determine the IGP cost. That is, the eiBGP routes are redistributed into the IGP with the route's own metric rather than a configured metric. This process preserves the preferences of routes within the IGP even when the IGP routes are used to forward traffic. This guarantees path symmetry for traffic between Site3 and Site1 networks. As mentioned earlier, all routers prefer a route advertised by eBGP, even when the route is also learned via an IGP. For example, if SER1(Site1) receives routes s/26 and t/26 via eiBGP from SERa(Site3), and also via IGP from SER2(Site1), SER1(Site1) prefers the eiBGP routes and forwards any traffic to those destinations via SERa(Site3).

The need for IGP can be further illustrated by considering traffic flow between a Host S.1 (also s.1) in Site3 to a Host A.129 (also c.129) in Site1:
1. s.1->SERa(Site3)->SER1(Site1)->a.129

Since SER1(Site1) has a connected route A/24 that matches the address, a.129,

SER1(Site1) forwards traffic directly to a.129 using that route.

2. a.129->SER3(Site1)

SER3(Site1) is the default router for a.129, which belongs to the host group, c/26.

3. The only route for s.1 in the routing table of SER3(Site1) is s/26 learned via IGP from SER1(Site1). SER3(Site1) forwards the packet to SER1(Site1) and sends an ICMP redirect to a.129. Any future replies take the following route:

4. a.129->SER1 (Site1)->SERa(Site3)->s.1

Note that the paths shown in steps 1 and 4 are again symmetric.

The use of multiple SERs with similar connectivity for load distribution presents a unique problem with failure handling using ICMP redirect messages. Hosts do not timeout their IP route cache entries because of the ICMP redirects they receive. Without such timeouts, traffic that was diverted to the backup SER during a failure continues to use the backup SER even after failure recovery. For example, when SER1(Site1) loses an eBGP session with its PE1(Site1) router (because of link failures or PE1(Site1) failure), SER1 (Site1) starts using the routes received via iBGP from SER2(Site1). All hosts sending traffic to SER1(Site1) receive ICMP redirect messages with SER2(Site1) as the gateway address. When the eBGP session between SER1(Site1) and PE1(Site1) comes up after failure recovery, hosts will continue to use SER2(Site 1) as the next-hop router for existing traffic flows. This will result in uneven load distribution after failure recovery.

In a preferred embodiment of the present invention, the hosts periodically timeout the route entries created by ICMP redirects. If the route cache entry created above times out before the failure is rectified, SER1 (Site1) sends another ICMP redirect.

The present invention presents a method to build a network for applications such as Voice over IP. The invention utilizes pure IP technologies without requiring circuit-switched link-layer technologies or MPLS. It also uses standard IP routing protocols requiring no extensions. The invention provides resilience by building redundant planes of connectivity between routers that back each other up. The invention provides path symmetry by (1) advertising different metrics for host groups by the primary and backup routers, and (2) carrying those metrics across Autonomous System boundaries. The invention extends the transport network across cascading sites so that path symmetry can be preserved even when all site networks are not connected directly to the transport network. Within the extended transport network, the invention replaces using a full-mesh iBGP between all provider edge routers with a collection of IGP and iBGP pairings such that path symmetry can be maintained even with cascading sites and even in the presence of single failures. Finally, the invention restores load balance across routers after a failure recovery by periodically timing out route cache entries created by ICMP redirect messages received at the hosts.

Existing IP routing and forwarding techniques are incapable of providing path symmetry for bi-directional traffic in the presence of multiple paths between two communicating end points. Yet, these multiple paths are often necessary for scalability or availability reasons. The present invention provides a method of building a telecom site network using existing IP technologies that offers path symmetry for bi-directional traffic, such as Voice over IP, without using circuit-switched link-layer technologies such as ATM or Frame Relay. The present invention allows scaling of the network by deploying multiple low-cost routers with ubiquitous Ethernet interfaces. Thus, the invention provides path symmetry while also offering router and link resilience and scalability.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A system for improving network performance when communicating between a first site network and a second site network via an Internet Protocol (IP) based transport network, wherein the first and second site networks include a local area network (LAN) and a plurality of host/media gateways (MGWs) connected to the LAN, said system comprising:

first and second Site Edge Routers (SERs) in each site network that handle traffic from different host/MGWs, said SERs being connected to the LAN, and wherein each SER carries a first portion of the traffic from the SER's site network with a first preference, and a second portion of the traffic from the SER's site network with a second, lower preference;

first and second Provider Edge (PE) routers in the transport network, wherein the first SER connects to the first PE router via a first SER-PE link, and the second SER connects to the second PE router via a second SER-PE link, each of said SER-PE links carrying bidirectional traffic for both the first and second SERs, and each of said SER-PE links having enough spare capacity to carry all of the traffic coming from both the first and second SERs in case the first or second SER fails; and means within the first and second SERs for guaranteeing symmetric paths for bidirectional traffic on each SER-PE link by providing preferred routing information to the first and second PE routers.

2. The system of claim 1, wherein the means within the first and second SERs for guaranteeing symmetric paths for bidirectional traffic on each SER-PE link includes means within each given SER for advertising with a high preference, a routing prefix for the host/MGW served by the given SER.

3. The system of claim 2, wherein the means within the first and second SERs for guaranteeing symmetric paths for bidirectional traffic on each SER-PE link also includes means within each given SER for advertising with a lower preference, a routing prefix for the host/MGW served by the SER that the given SER backs up.

4. The system of claim 1, wherein the first and second SERs utilize External Border Gateway Protocol (eBGP) to communicate with the first and second PE routers.

5. The system of claim 4, wherein the first and second SERs utilize Internal Border Gateway Protocol (iBGP) to communicate with each other.

6. The system of claim 4, wherein the means within the first and second SERs for guaranteeing symmetric paths for bidirectional traffic on each SER-PE link utilizes a BGP Multi-Exit Discriminator (MED) to convey the preferred routing information in eBGP.

7. The system of claim 4, wherein the first and second SERs also utilize Virtual Router Redundancy Protocol (VRRP) to backup each other if the first or second SER fails.

8. The system of claim 4, wherein, if the first and second SERs receive routing information via more than one communication protocol, the routing information received via eBGP is preferred.

9. The system of claim 1, wherein, for increased link bandwidth from the host/MGWs, the first and second SERs are connected to the host/MGWs over different LANs.

10. The system of claim 1, wherein, for increased SER bandwidth, additional pairs of SERs are connected to the LAN.

11. The system of claim 1, wherein the LAN includes a plurality of IP subnets for connecting different host/MGWs, and the host/MGWs on each IP subnet form a different host group, wherein all of the host/MGWs in a host group are configured to use the same SER as a default router.

12. The system of claim 11, wherein each given SER advertises with a high preference, a routing prefix for the host group served by the given SER, and advertises with a lower preference, the routing prefix for the host group served by the SER that the given SER backs up.

13. The system of claim 1, wherein the first and second SERs are connected to the host/MGWs via a plurality of LANs, and the host/MGWs on each LAN form a different host group, wherein all of the host/MGWs in a host group are configured to use the same SER as a default router.

14. The system of claim 13, wherein each given SER advertises with a high preference, a routing prefix for the host group served by the given SER, and advertises with a lower preference, the routing prefix for the host group served by the SER that the given SER backs up.

15. The system of claim 1, further comprising a third site network connected to the first site network, said third site network including a LAN, a plurality of host/MGWs connected to the LAN, and at least first and second SERs connected to the LAN, wherein each of the SERs in the third site network is connected to only one SER in the first site network.

16. The system of claim 15, wherein the SERs in the third site network are configured as backup pairs utilizing Internal Border Gateway Protocol (iBGP) to communicate with each other, and utilizing External/Internal Border Gateway Protocol (eiBGP) to communicate with the SERs in the first site network, wherein the first and third site networks are configured as BGP confederations.

17. The system of claim 16, wherein an Interior Gateway Protocol (IGP) is configured between the SERs of the first site network for exchanging routing information, wherein only routing information learned via eiBGP sessions are redistributed into the IGP.

18. The system of claim 17, wherein a preference level for each route is utilized to determine an IGP cost, thereby providing path symmetry for traffic between the first and third site networks.

19. A method of providing path symmetry, resilience, and scalability when communicating between a first site network and a second site network via an Internet Protocol (IP) based transport network, wherein the first and second site networks include a local area network (LAN) and a plurality of host/media gateways (MGWs) connected to the LAN, said method comprising:

connecting first and second Site Edge Routers (SERs) to the LAN in each site network to handle traffic from different hostlMGWs, wherein each SER carries a first portion of the traffic from the SER's site network with a first preference, and a second portion of the traffic from the SER's site network with a second, lower preference;

connecting the first and second SERs to first and second Provider Edge (PE) routers in the transport network, wherein the first SER is connected to the first PE router via a first SER-PE link, and the second SER is connected to the second PE router via a second SER-PE link, each of said SER-PE links carrying bidirectional traffic for both the first and second SERs, and each of said SER-PE links having enough spare capacity to carry all of the traffic coming from both the first and second SERs in case the first or second SER fails; and guaranteeing symmetric paths for bidirectional traffic on each SER-PE link by providing by the first and second SERs, preferred routing information to the first and second PE routers.

20. The method of claim 19, further comprising connecting the first and second SERs to the host/MGWs over different LANs to provide increased link bandwidth from the host/MGWs.

21. The method of claim 19, further comprising connecting additional pairs of SERs to the LAN to provide increased SER bandwidth.

22. The method of claim 19, wherein the step of guaranteeing symmetric paths for bidirectional traffic on each SER-PE link includes each given SER advertising with a high preference, a routing prefix for the host/MGW served by the given SER.

23. The method of claim 22, wherein the step of guaranteeing symmetric paths for bidirectional traffic on each SER-PE link also includes each given SER advertising with a lower preference, a routing prefix for the host/MGW served by the SER that the given SER backs up.

* * * * *